(12) United States Patent
Yokoyama et al.

(10) Patent No.: US 6,947,359 B2
(45) Date of Patent: Sep. 20, 2005

(54) OPTICAL DISK DEVICE FOR DATA DEFECT DETECTION AND USE

(75) Inventors: Eiji Yokoyama, Tokyo (JP); Tomoaki Ryu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 839 days.

(21) Appl. No.: 09/784,040

(22) Filed: Feb. 16, 2001

(65) Prior Publication Data

US 2001/0021148 A1 Sep. 13, 2001

(30) Foreign Application Priority Data

Mar. 1, 2000 (JP) ..................................... P2000-055447

(51) Int. Cl.⁷ .............................................. G11B 7/00
(52) U.S. Cl. ............................... 369/44.29; 369/53.15; 369/44.32
(58) Field of Search .......................... 369/53.15, 44.29, 369/44.32, 44.35

(56) References Cited

U.S. PATENT DOCUMENTS

| RE30,564 E | * | 3/1981 | Brown et al. ............... 318/561 |
| 4,406,000 A | | 9/1983 | Shoji et al. |
| 4,587,644 A | | 5/1986 | Fujiie |
| 4,817,077 A | * | 3/1989 | Ono ............................. 369/54 |
| 4,851,755 A | * | 7/1989 | Fincher ....................... 318/696 |
| 5,426,625 A | * | 6/1995 | Bui et al. ................ 369/44.32 |
| 6,052,348 A | | 4/2000 | Belser et al. |
| 6,172,953 B1 | | 1/2001 | Kamiyama |
| 6,259,663 B1 | * | 7/2001 | Tateishi ................... 369/53.12 |
| 6,307,822 B1 | * | 10/2001 | Shim et al. .............. 369/47.18 |

FOREIGN PATENT DOCUMENTS

| EP | 0814462 A2 | 12/1997 |
| JP | A668502 | 3/1994 |
| JP | 11259871 | 9/1999 |

* cited by examiner

*Primary Examiner*—Doris H. To
*Assistant Examiner*—Gautam R. Patel
(74) *Attorney, Agent, or Firm*—Birch, Stewart, Kolasch & Birch, LLP

(57) ABSTRACT

A disk physical strain correction signal generator outputs a signal obtained by allowing a phase compensation signal to pass a LPF as a disk physical strain correction signal during a normal period. During a defect detection period, it outputs the output signal of the LPF sampled at the time of the defect detection start as the disk physical strain correction signal. A disturbance pulse correction signal is output based upon a disturbance pulse obtained by subtracting the disk physical strain correction signal from the phase compensation signal. The disk physical strain correction signal and the disturbance pulse correction signal are added to output a defect compensation signal. This defect compensation signal is applied as an actuator control signal during the defect detection period. Thus, it is possible to provide an optical disk device which can carry out a stable driving control for a reproducing operation, etc. without losing the continuity of control before and after the defect detection even when the defect detection period is long.

7 Claims, 17 Drawing Sheets

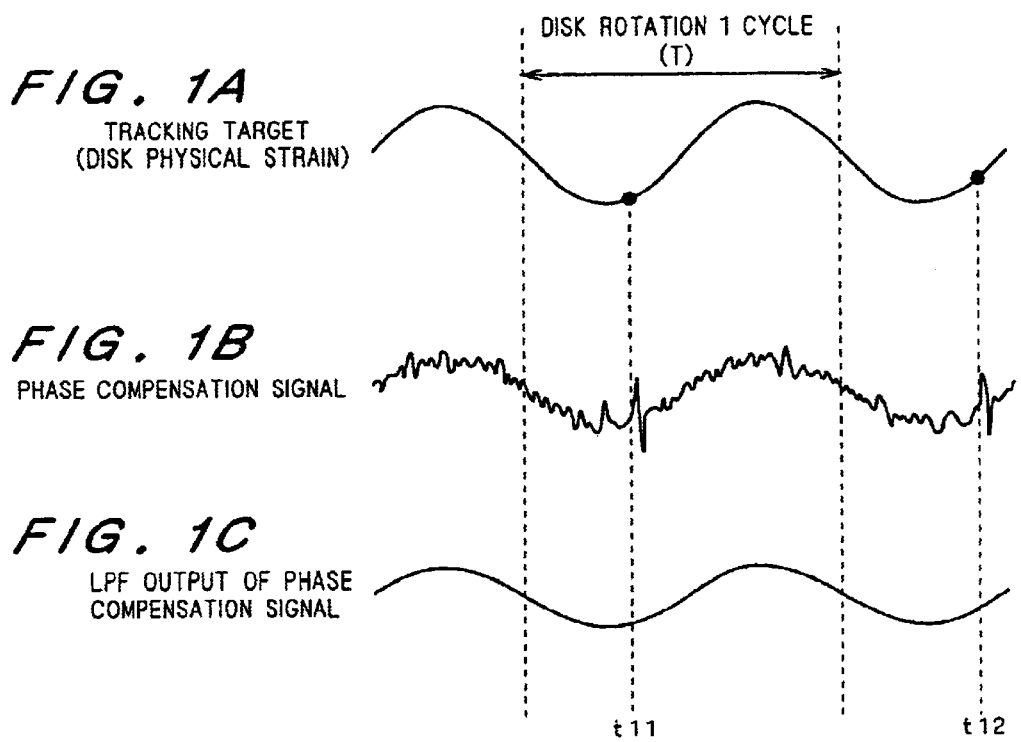

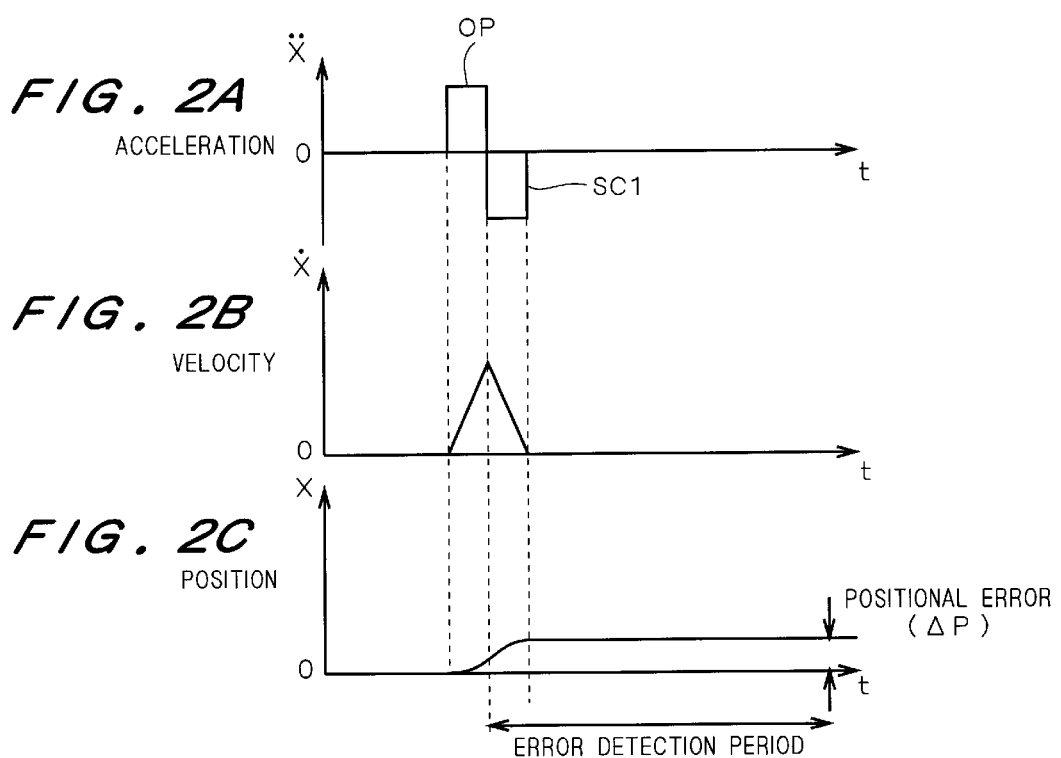

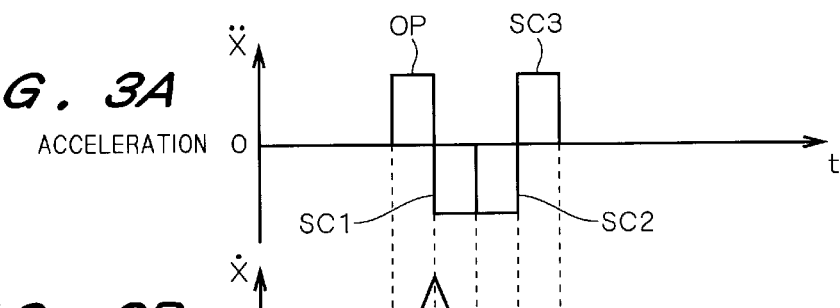
FIG. 3A ACCELERATION
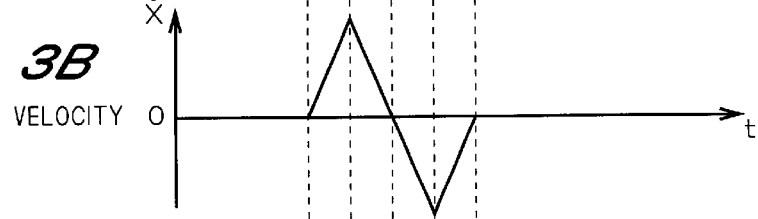
FIG. 3B VELOCITY
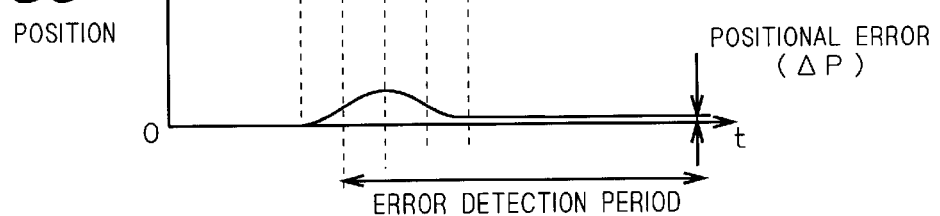
FIG. 3C POSITION

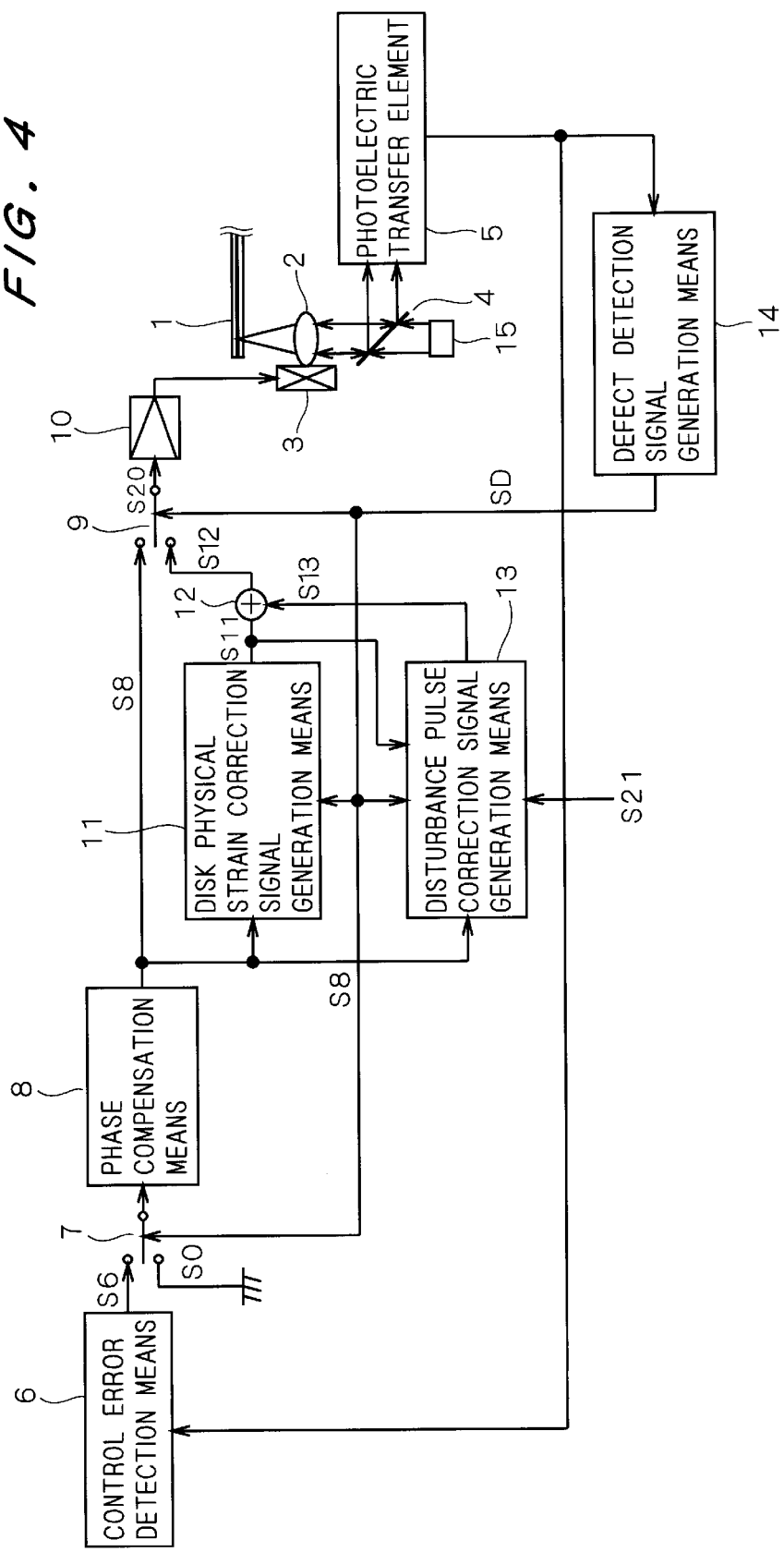

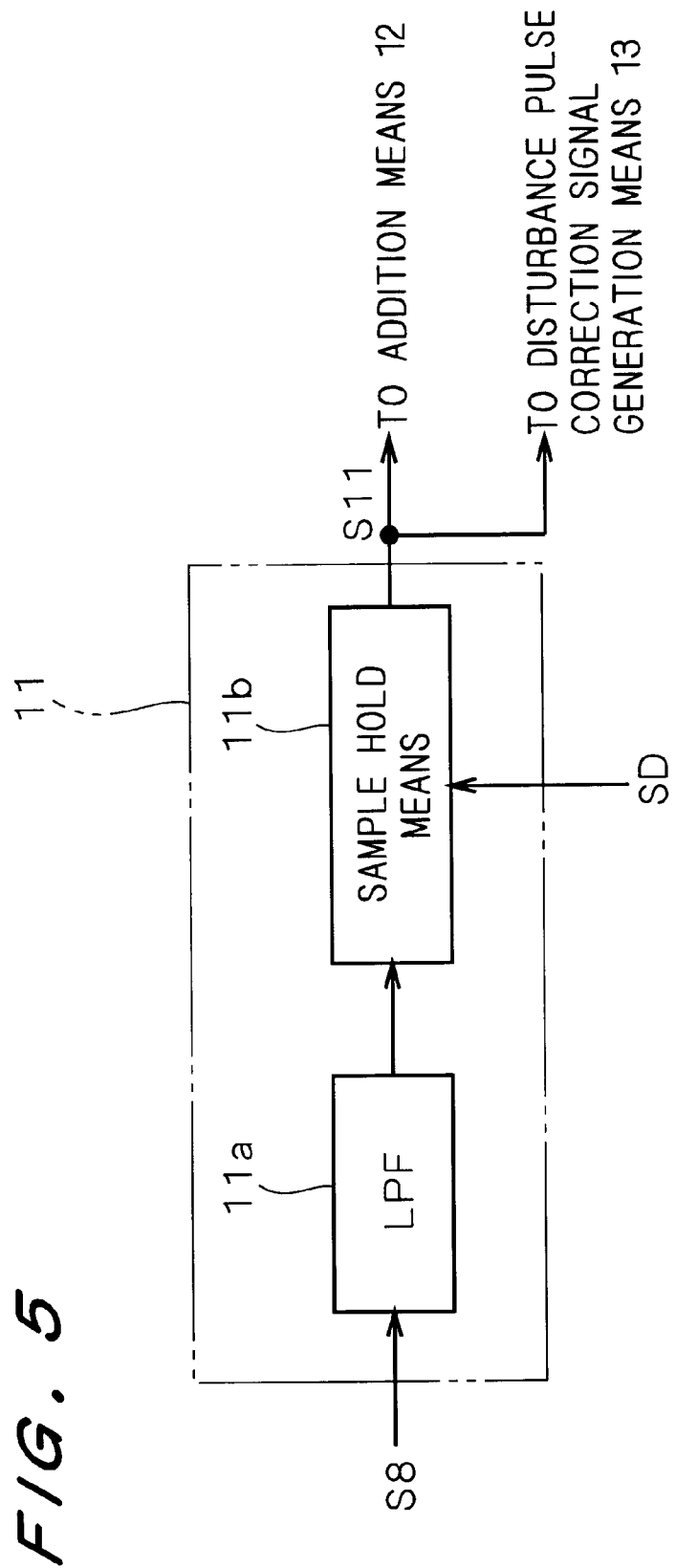

READ OUT IN THE ORDER OF R0 TO R(n - 1)

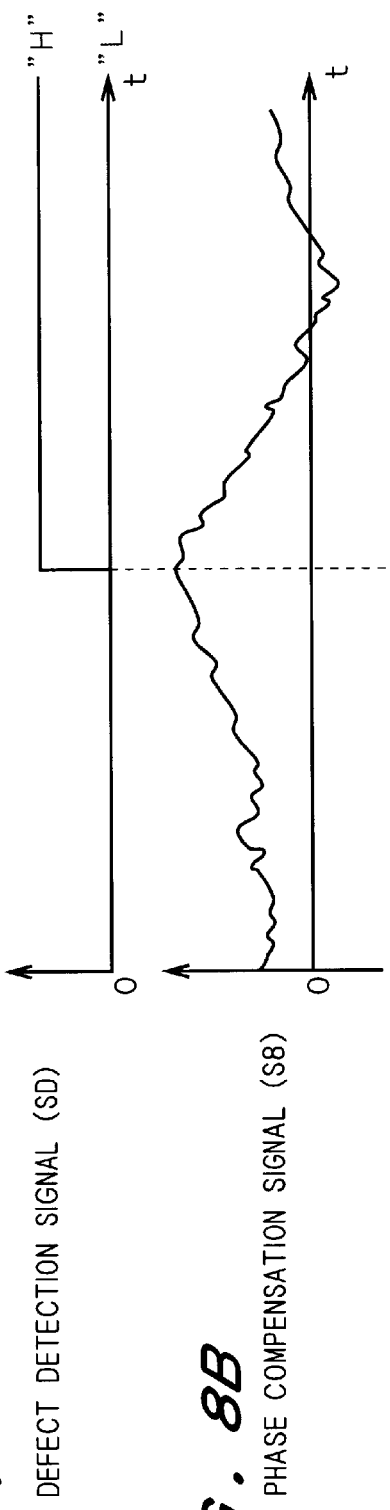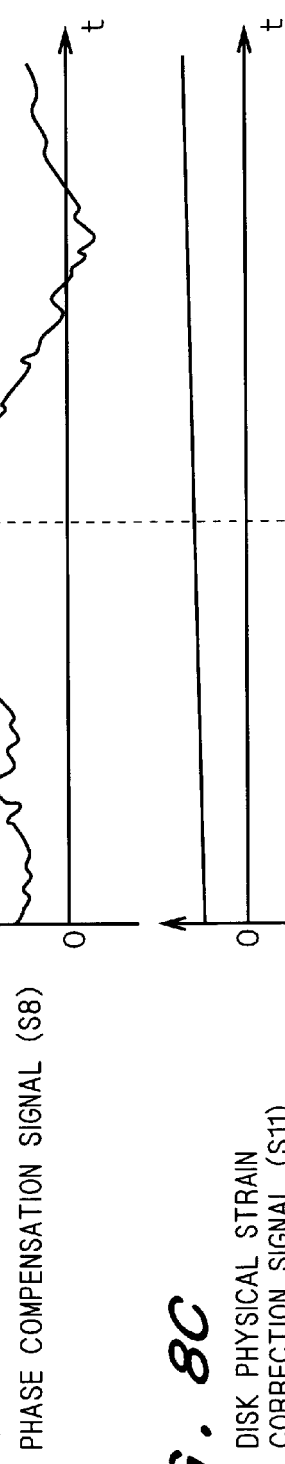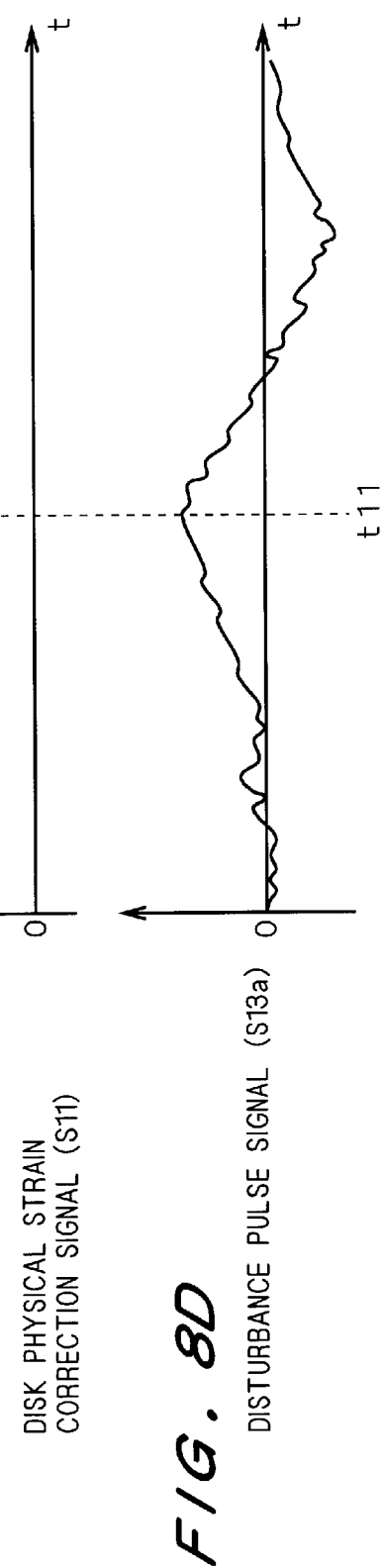
FIG. 8A DEFECT DETECTION SIGNAL (SD)
FIG. 8B PHASE COMPENSATION SIGNAL (S8)
FIG. 8C DISK PHYSICAL STRAIN CORRECTION SIGNAL (S11)
FIG. 8D DISTURBANCE PULSE SIGNAL (S13a)

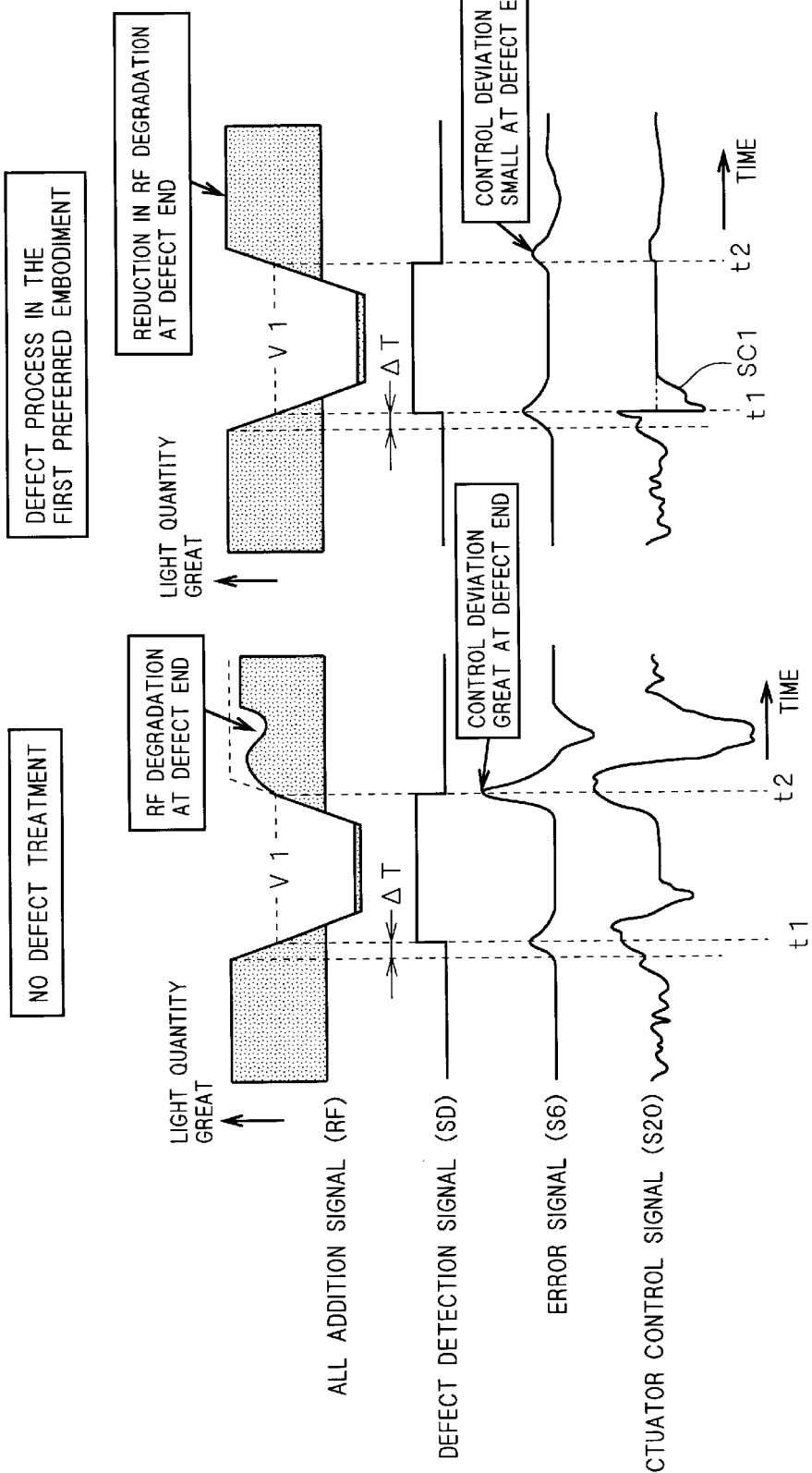

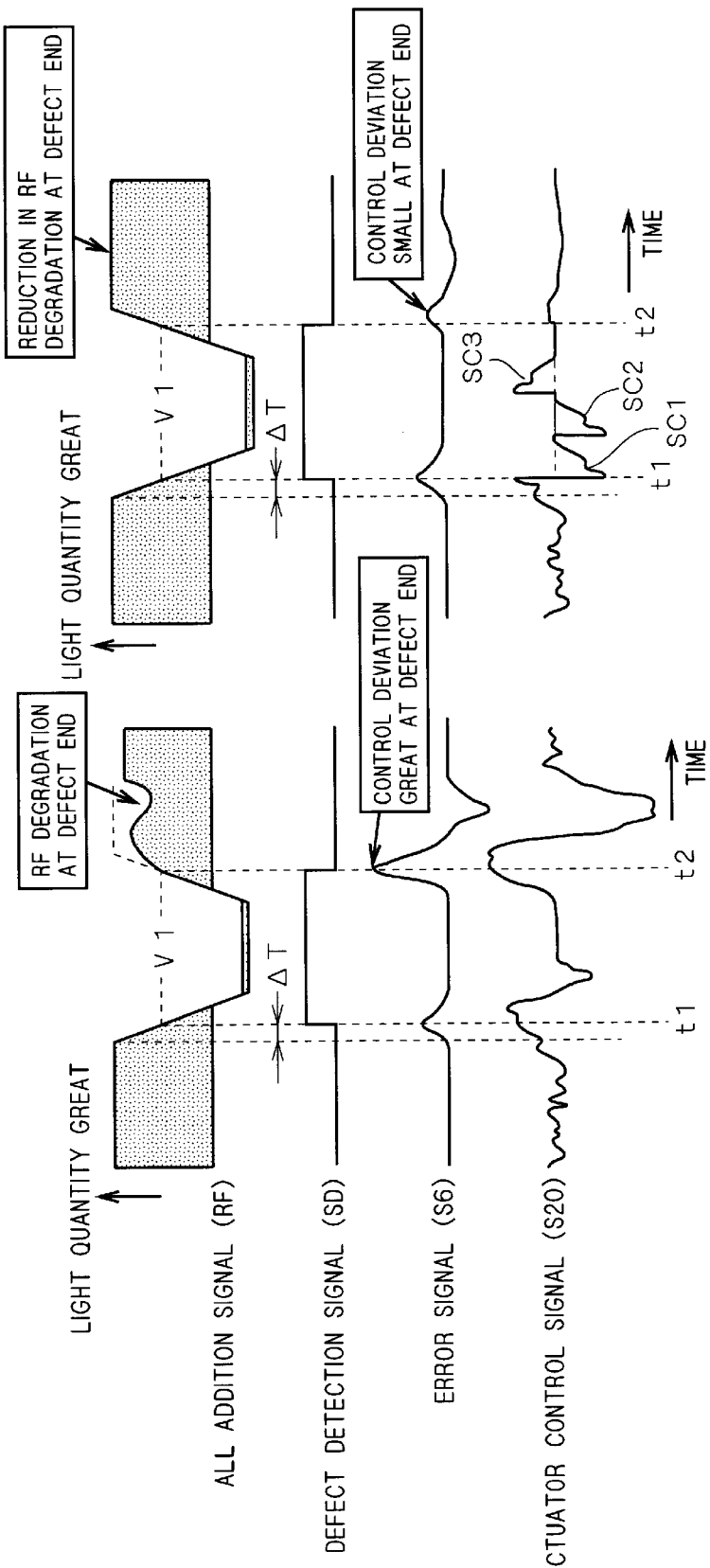

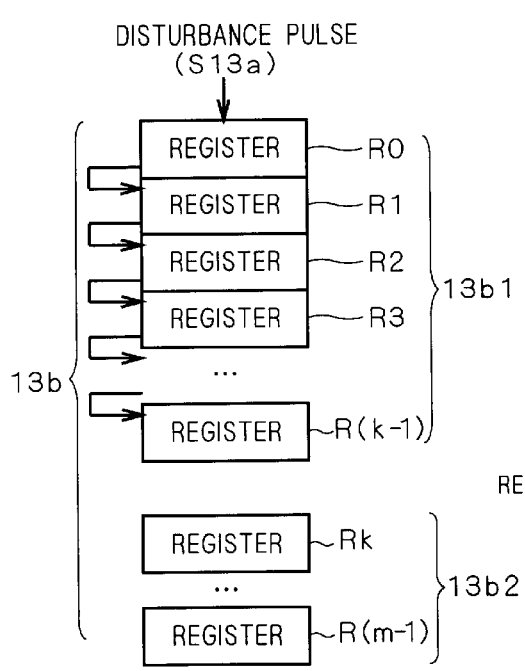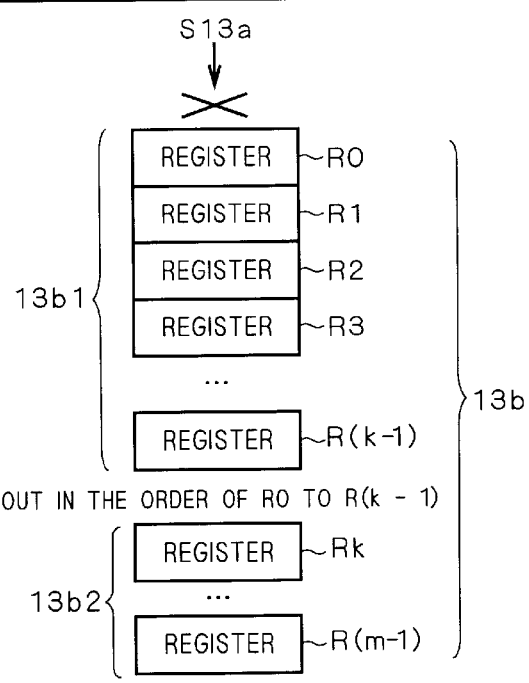
*FIG. 12A* — DEFECT DETECTION SIGNAL SD = "L"
*FIG. 12B* — DEFECT DETECTION SIGNAL SD = "H"
READ OUT IN THE ORDER OF R0 TO R(k − 1)

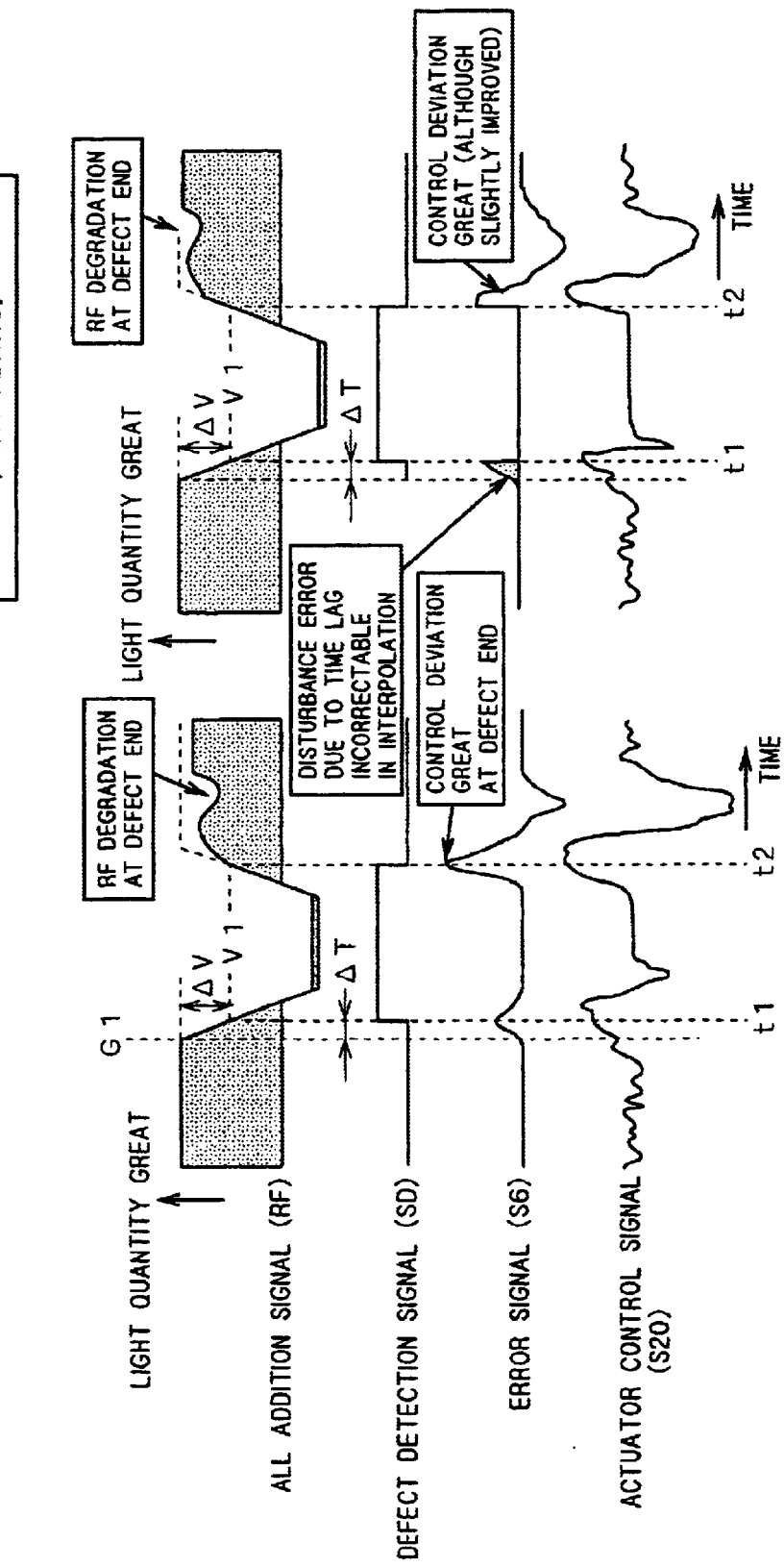

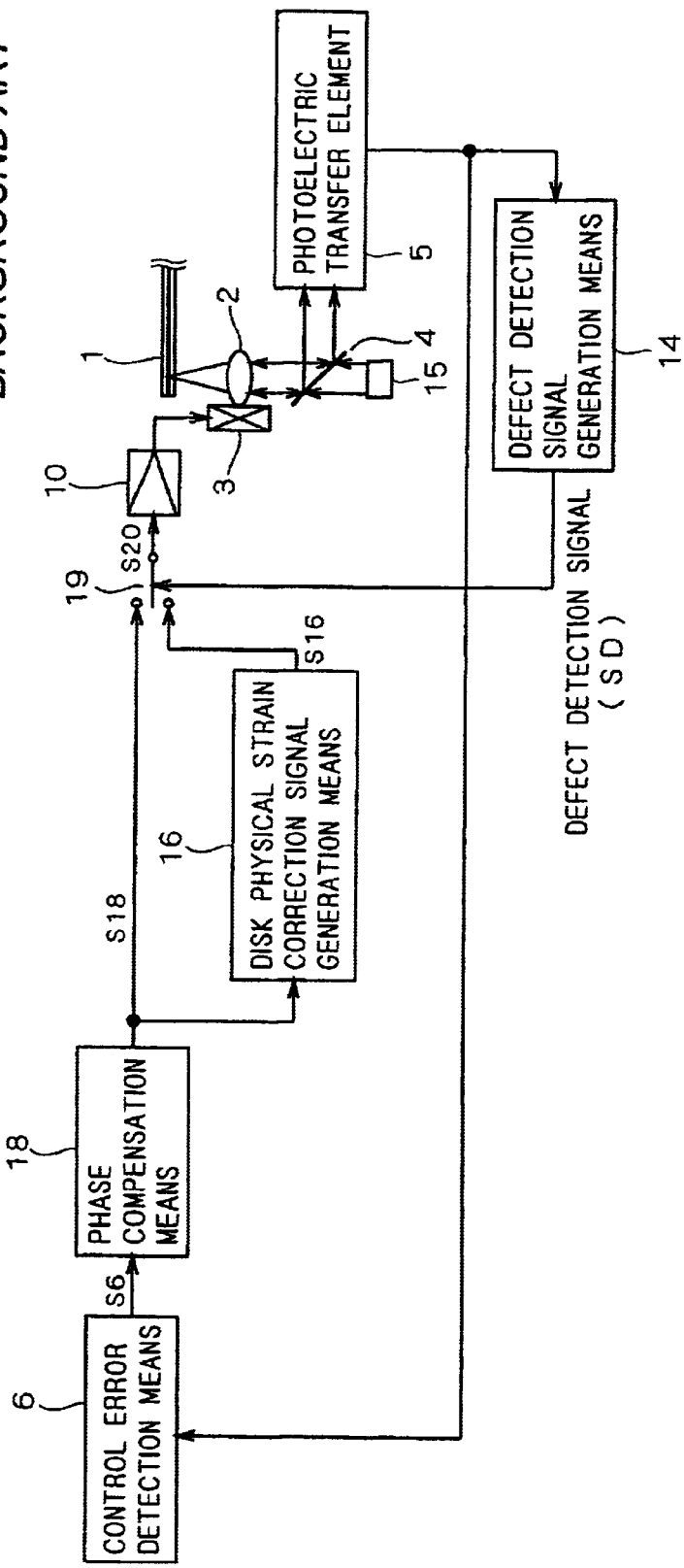

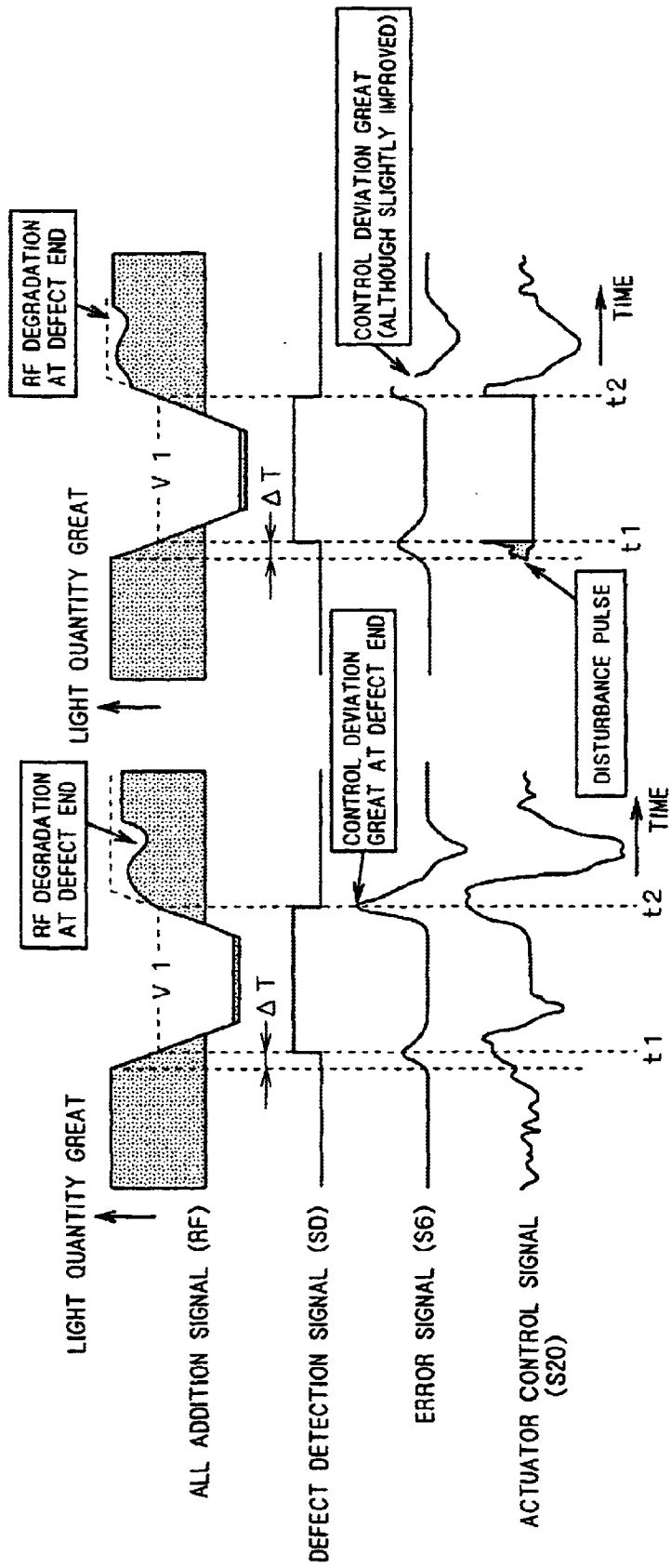

ACCELERATION

VELOCITY

POSITION

OPTICAL DISK DEVICE FOR DATA DEFECT DETECTION AND USE

BACKGROUND OF THE INVENTION

1. Field of the Invention

The present invention relates to an optical disk device such as a DVD and a CD, and more particularly concerns a control system which can cancel adverse effects caused by a defect located on the optical disk.

2. Description of the Background Art

In optical disk apparatuses, various methods for reproducing data from a disk in spite of defects such as scratches and stain (hereinafter, referred to as "defective disks") located thereon have been proposed, and for example, Japanese Patent Application Laid-Open No. 11-259871 (1999) discloses a method in which upon reproducing data from a defective disk, the data is reproduced while interpolating error signals.

FIG. 13 is a block diagram that schematically shows a construction (first construction) of a conventional defect compensating device for defective disks in accordance with the above-mentioned publication.

As illustrated in the Figure, a laser light beam, outputted from a light-emitting optical system 15 including a semi-conductor LD (Laser diode) at the time of data recording or data reproduction, is converged onto a (DVD) disk 1 through a half mirror 4 and an objective lens 2. Light reflected from the disk 1 at the time of data reproduction is, on the other hand, inputted to a photoelectric transfer element 5 through the half mirror 4.

An actuator driving coil 3 is rigidly connected (firmly connected so as to move integrally) to the objective lens 2, and the driving coil 3 is placed in a magnetic circuit so that the objective lens 2 is shifted by the driving coil 3 in a direction perpendicular to the disk 1.

Based upon the photoelectric transfer signal obtained from the photoelectric transfer element 5, a defect detection signal generation means 14 generates a detect detection signal SD indicating a detection state of the presence or absence of a disk defective area which lacks optical information due to scratches or strain formed on the surface of a disk 1.

Based upon the photoelectric transfer signal obtained from the photoelectric transfer element 5, a detect detection signal generation means 14 generates a detect detection signal SD indicating a detection state of the presence or absence of a disk defective area which lacks optical information due to scratches or stain formed on the surface of a disk 1.

Based upon the defect detection signal SD, the selection switch 19 inputs one of the error signal S6 and the disk physical strain correction signal S16 to a phase compensation means 18. Based upon the inputted signal through the selection switch 19, the phase compensation means 18 outputs an actuator control signal S20 (phase compensation signal S18) to a driver amplifier 10. Based upon the actuator control signal S20, the driver amplifier 10 controls the driving coil 3.

This defect compensation device has an arrangement in which the disk physical strain correction signal generation means 16 for correcting a physical strain inherent to the disk such as eccentricity and vertical deviation is added to a generally-used control loop. In other words, functional blocks, numbers 1 to 6 and 10 and 18, have general control-loop constructions to which functional blocks 14 and 16 for achieving a defective disk reproducing process are added.

Based upon the defect detection signal SD, while detecting a disk error, the selection switch 19 switches the input signal from the phase compensation means 18 from the error signal S6 to the disk physical strain correction signal S16 so that the control loop is cut off. The disk physical strain correction signal generation means 16 outputs the average value of the error signal S6 in a non-defective area as the disk physical strain correction signal S16.

An explanation will be given of a generally-used focusing control by the defect compensation device having the above-mentioned arrangement. In order to reproduce information recorded in an information recording layer on a disk 1, a laser light beam outputted from the light-emitting optical system 15 is always converged on the information recording layer on the disk 1 by the objective lens 2. In order to realize this, the objective lens 2 needs to be position-controlled so as to be always maintained at a predetermined relative position with respect to the disk 1.

The disk 1 has warping, and the absolute amount of the warping is standardized to, for example, not more than ±300 $\mu$m in the DVD standard. Since the disk 1 is rotated, the warping of the disk 1 causes the disk 1 to move up and down (hereinafter, referred to as "vertical deviation"); therefore, it is essential to provide tracking control for the objective lens 2. In this case, the object to be controlled is the objective lens 2, the target for the tracking operation is an information recording layer of the disk 1, and the kind of control is a relative positional control between the disk 1 and the objective lens 2. The position-controlling process for the objective lens 2 is provided by feeding a signal formed based upon a relative position error signal between the objective lens 2 and the disk 1 back to the driving means of the objective lens 2.

The above-mentioned construction is achieved by the following means: a means for detecting a relative position with respect to the disk 1 (constituent sections 1, 2, 4 and 5), a means for generating an error (hereinafter, referred to simply as "FES" (Focus Error Signal) between a detected relative position and a target predetermined relative position (error detection means 6), a phase compensation means for stabilizing a position control loop (phase compensation mean 18), and a driving means for changing the position of the objective lens 2 that is an object to be controlled (driving coil 3). Here, the phase compensation means 18 is generally constituted by a phase-upgrading filter for allowing the phase in the vicinity of 1 KHz to advance. The driving coil 3 is rigidly connected to the objective lens 2 so that the objective lens 2 is shifted in a direction perpendicular to the surface of the disk 1 by applying a driving current to the driving coil 3. An actuator control signal (focusing control signal) S20, which is an output of the phase compensation means 18, controls the driving current of the driving coil 3 that is applied by a driver amplifier 10 so that the control system for converging the laser light beam onto an information recording layer of the disk 1 is achieved.

The tracking control is only different from the focusing control in that in addition to the above-mentioned operations, a controlling process for shifting the objective lens 2 in a horizontal direction with respect to the surface of the disk 1 so as to track a track formed on the information recording layer of the disk 1, and is achieved by a construction including the above-mentioned focusing control system; therefore, the description thereof is omitted, and in FIG.

13, the corresponding description is given without distinction between the focusing and tracking controls. Moreover, the following description generally discuss them without the distinction.

Next, an explanation will be given of a defect compensation method by the conventional defect compensation device shown in FIG. 13. The signal to be applied to the driving coil 3 at the time of detecting a defect is defined by the actuator control signal S20 obtained by allowing the disk physical strain correction signal S16 to pass through the phase compensation means 18. Selection is made between the error signal S6 and the disk physical strain correction signal S11 by the selection switch 19 so that state transitions between a normal controlling state and a defect compensating state is carried out.

The disk physical strain correction signal generation means 61 outputs the average value of an error signal in a normal state free from a defect as a disk physical strain correction signal S16; therefore, it is possible to properly maintain the continuity of the error signal S6 even in the event of a defect, and consequently to realize a defect compensation.

The essential condition required for a stable, positive defect compensation process is defined by whether or not a drawing process for the control loop can be normally performed immediately after the defect compensation operation, that is, at the time of completion of the defect (hereinafter, referred to as "defect end"). The conditions for stably drawing the control loop are that the positional difference between the tracking target position at the time of the drawing operation and the position of the objective lens 2 is set in the vicinity of zero and that the relative velocity between the objective lens 2 and the tracking target is close to zero. In other words, if the following conditions 1 and 2 are satisfied; then it is possible to achieve a stable, positive defect compensation process.

Condition 1: The control error (difference between the position of the objective lens 2 and the tracking target position) is zero at the defect end.

Condition 2: The relative velocity (hereinafter, referred to as "relative velocity after the defect compensation process") between the objective lens 2 and the disk 1 is zero at the defect end.

FIGS. 14A and 14B are explanatory drawings that show defect compensation operation by the defect compensation device. Referring to FIGS. 14A and 14B, the following description will discuss problems with the conventional defect compensation operation. From top to bottom in the Figures, time-wise fluctuations of an all addition signal of the photoelectric transfer signal (hereinafter, referred to as "RF signal") obtained from respective areas of the photoelectric transfer element 5, the defect detection signal SD, the error signal S6 and the actuator control signal S20 are shown, and FIG. 14A shows a case in which no defect process is carried out, and FIG. 14B shows a case in which the conventional defect process (first method) by using the construction of FIG. 13 is applied thereto. Here, in FIG. 14B, a normal reproducing process is carried out while the defect detection signal SD goes "low" (normal period), and a defect process is carried out while it goes "high" (defect detecting period).

As illustrated in FIG. 14A, in the case of no defect process, from the start of a defect (a point of time from which the RF signal starts to decrease: hereinafter, referred to simply as "defect start"), a disturbance error is mixed into the error signal S6 as the RF signal decreases, and at the time when the RF signal becomes zero (that is, the quantity of reflected light from the disk 1 becomes virtually zero), the error signal S6 itself becomes undetectable (meaningless). Since the control system performs the controlling operation based upon the error signal S6, it tracks the disturbance error. At the defect end, since the control system is taken too far by the disturbance error, a great control error tends to occur, and in the worst case, it sometimes exceeds the detection range (preliminarily determined) of the control error, resulting in an inoperable state in the control.

As illustrated in FIG. 14B, in the case of a conventional defect compensation, when the defect detection signal goes "high", the disk physical strain correction signal S16 (a representative value (average value) of the error signal S6 at the time of normal playback) is used in place of the error signal S6 so as to make an interpolation process, it is possible to reduce the effects of the disturbance error; however, the following problems tends to arise.

In the case of the general defect detection method, in order to ensure stability in the normal reproducing mode, setting is made so as to detect the presence of a defect when the quantity of reflected light from the disk becomes not more than a predetermined value that is slightly lower than the normal peak value, that is, a predetermined non-sensitive band is provided. With respect to the construction of such a typical defect detection signal generation means 14, as illustrated in FIGS. 14A and 14B, a construction has been proposed in which, at the time t1 when a signal obtained by peak-detecting the RF signal becomes not less than a value V1 that is lower than the normal peak value by ΔV, the defect detection signal SD is allowed to go "high", thereby entering the defect detecting state.

In this construction, during the time ΔT from the defect start until the RF signal has becomes lower than the value V1, the defect detecting process becomes inoperable; therefore, there might be an inevitable time lag in the defect detection with respect to a true defect. Even during the inevitable time lag period ΔT, since the signal is optically being influenced by the defect, a disturbance error tends to be mixed into the error signal S6.

In the conventional defect compensation method (first method) shown in FIG. 14B, it is not possible to carry out an interpolation process on the disturbance error during the inevitable time lag period ΔT. In general, the residual disturbance error during the time lag period ΔT has frequency components of several hundreds to several kHz, and this is further emphasized by the phase compensation means 18 at the time t2 when the selection switch 19 makes a switch from the disk physical strain correction signal S16 to the error signal S6 upon receipt of the trailing edge "L" of the defect detection signal SD, with the result that the actuator control signal S20 is taken too far, causing an inevitable control deviation at the defect end.

In other words, the conventional defect compensation device shown in FIG. 13 fails to satisfy both of the aforementioned conditions 1 and 2 required for a stable, positive defect compensation process.

In order to reduce the influence of the emphasis given on the disturbance error contained in the error signal S6 by the phase compensation means 18, for example, an arrangement has proposed in which the disk physical strain correction signal generation means 16 and the selection switch 19 are placed on stages after the phase compensation means 18.

FIG. 15 is a block diagram that shows a second construction of the conventional defect compensation device. As illustrated in this Figure, the phase compensation means 18 receives the error signal S6, the disk physical strain correction signal generation means 16 outputs the disk physical strain correction signal S16 based upon the phase compensation signal S18, and the selection switch 19 sends either of the phase compensation signal S18 and the disk physical strain correction signal S16 to the driver amplifier 10 as the actuator control signal S20. Here, since the other arrangements are the same as those shown in FIG. 13, the description thereof is omitted.

FIGS. 16A and 16B are explanatory drawings that show a defect compensation operation by the defect compensation device shown in FIG. 15. In these Figures, the definitions on the respective waveforms are the same as those of FIGS. 14A and 14B, and FIG. 16A shows a case in which no defect process is carried out, and FIG. 16B shows a case in which the conventional defect process (the second method) is carried out by the construction shown in FIG. 15.

A pulse (hereinafter, referred to as "disturbance pulse"), which is caused by a disturbance error in the actuator control signal S20, and shown on lower right of FIG. 16B, is improved as compared with the first method, since the actuator control signal S20 is switched to the disk physical strain correction signal S16 by the selection switch 19 during the defect detection period while the defect detection signal SD is going "high"; however, the actuator control signal S20 is always subjected to a certain amount of a residual disturbance pulse occurring during the time lag period ΔT before the time t1. The actuator control signal S20 is kicked by the residual disturbance pulse, with the result that a control deviation occurs from a predetermined velocity at the defect end. Consequently, even in the construction shown in FIG. 15, it is not possible to satisfy both of the conditions 1 and 2 required for a stable, positive defect compensation operation.

FIGS. 17A to 17C are explanatory drawings that show influences caused by the application of the disturbance pulse on the velocity and position of the actuator. Referring to FIGS. 17A to 17C, the following description will generally discuss the above-mentioned problems. Supposing that the mechanical characteristics of the actuator including the driving coil 3 that is a subject to be controlled are secondary systems, the position, velocity and acceleration (in proportion to the signal applied to the driving coil 3) of the objective lens 2 are defined as shown by Expressions (I) to (III).

[Expression 1]

$$\text{Position} = X(t) \quad (I)$$

[Expression 2]

$$\text{Velocity} = \dot{X}(t) \quad (II)$$

[Expression 3]

$$\text{Acceleration} = \ddot{X}(t) \quad (III)$$

In FIGS. 17A to 17C, FIG. 17A represents the acceleration, FIG. 17B represents the velocity, and FIG. 17C represents the positional change with time. Assuming that the disturbance pulse has a rectangular waveform as shown in FIG. 17A, the influences this rectangular waveform exerts on the velocity and position of the actuator are explained as follows:

(1) During the application of the disturbance pulse, the velocity of the actuator increases in a manner of a linear function, and when the application of the disturbance pulse is stopped, the velocity at the time of the end of the disturbance pulse is maintained (see FIG. 17B).

(2) During the application of the disturbance pulse, the position of the actuator increases in a manner of a quadratic function, and even when the application of the disturbance pulse is stopped, the position keeps increasing linearly while maintaining the gradient at the time of the end of the disturbance pulse (see FIG. 17C).

The above-mentioned facts indicate that due to (1), it is not possible to satisfy the condition 2 required for a stable, positive defect compensation operation (that is, the relative velocity after the defect compensation process is zero), and that due to (2), it is not possible to satisfy the condition 1 (that is, the control error is zero). Since the timing of the disturbance pulse end coincides with the start of the defect detection period, the conventional defect compensation method makes the positional error greater in proportion to the defect detection period, sometimes resulting in a case in which the error detection range is exceeded.

SUMMARY OF THE INVENTION

According to a first aspect of the present invention, an optical disk device comprises a light emitting means for emitting light to an optical disk, a driving means for carrying out a predetermined operation with respect to the optical disk based upon a driving control signal, a reflected light information detection means for detecting reflected light information related to reflected light from the optical disk, a normal control signal generation means for generating a normal control signal for determining the amount of control in the predetermined operation based upon the reflected light information, and a defect detection signal generation means for generating a defect detection signal for specifying the presence or absence of a defect area lacking optical information in the optical disk based upon the reflected light information. In this arrangement, it is defined that a period in which the defect detection signal indicates that there is no defect area is defined as a normal period and a period in which the defect detection signal indicates that there is a defect area is defined as a defect detection period, and this arrangement is further provided with: a low frequency correction signal generation means for performing a filtering process to the normal control signal, the filtering process allowing a varying frequency of the normal control signal to pass and removing a high frequency component of the same to generate a low frequency component signal as a low frequency correction signal in the normal period, and for generating the low frequency component signal sampled at the time of defect detection start when the normal period is switched to the defect detection period as the low frequency compensation signal in the defect detection period; a disturbance pulse correction signal generation means for recognizing a disturbance pulse based upon a difference between the low frequency correction signal and the normal control signal during a period from the time of the defect detection start back to a predetermined point of time to generate a disturbance pulse correction signal containing a first correction pulse obtained by inverting a polarity of the disturbance pulse with the same impulse with the disturbance pulse; an addition means for obtaining a defect compensation signal by adding the disturbance pulse correction signal to the low frequency correction signal; and a signal selection means for selecting the normal control signal as the driving control signal during the normal period, and selecting the defect compensation signal as the driving control signal during the defect detection period.

Moreover, in a second aspect of the present invention which relates to an optical disk device according to the first aspect, the disturbance pulse correction signal includes a second and third correction pulse succeeding to the first correction pulse, the second correction pulse includes a pulse obtained by inverting the polarity of the disturbance pulse with the same impulse as the disturbance pulse, the third correction pulse includes a pulse that has the same polarity and the same impulse as the disturbance pulse.

Moreover, in a third aspect of the present invention which relates to the optical disk device according the first or second aspect, the predetermined operation includes a reproducing operation of information recorded on the optical disk, and the predetermined time is set based upon a reproducing linear velocity that is a linear velocity at the time of the reproducing operation of the optical disk.

Moreover, in a fourth aspect of the present invention which relates to the optical disk device according to the first to third aspects, the disturbance pulse correction signal generation means comprises a predetermined number of registers that successively stores the disturbance pulses while shifting them in a predetermined order during the normal period, the predetermined time includes a period of time during which the registers carried out the storing process, the optical disk device further comprising a correction pulse generation control means for generating the disturbance pulse correction signal based upon the disturbance pulses being reproduced by reading out the data stored in the registers at the time of defect detection start in the predetermined order, during the defect detection period.

In the optical disk device according to the first aspect, during the defect detection period, a defect compensation signal, which is formed by adding the disturbance pulse correction signal to the low frequency correction signal, is used as a driving control signal for the driving means.

A low-frequency correction signal is a signal formed by sampling a low-frequency component signal that is formed by removing a disturbance pulse that is a high-frequency component from a normal control signal and allowing fluctuation frequency components of the normal control signal to pass; therefore, its defect detection period is generally small as compared with the fluctuation period of the normal control signal so that it is possible to maintain the controlling continuity of the driving means at the time when the driving control signal is switched from the defect compensation signal to the normal control signal upon returning from the defect detection period to the normal period.

Moreover, the disturbance pulse correction signal contains the first correction pulse obtained by inverting the polarity with the same impulse as disturbance pulses generated during a period from the time of the defect detection start back to a predetermined point of time; therefore, it becomes possible to virtually cancel completely adverse effects given by a disturbance pulse (mixed to the normal control signal during a time period immediately before the defect detection) to the control velocity of the driving means, independent of the length of the defect detection period. Therefore, it is possible to control the driving means in a stable manner even when the defect detection period is long.

In the optical disk device according to the second aspect, the disturbance pulse correction signal contains the first to third correction pulses so that it becomes possible to virtually cancel completely adverse effects given by a disturbance pulse to the control position of the driving means by using the second and third correction pulses. Therefore, it is possible to control the driving means more stably even when the defect detection period is long.

In the optical disk device according to the third aspect, the predetermined time that is a recognition period of a disturbance pulse is set based upon the reproducing linear velocity of the optical disk so that it is set to a period of time suitable for the pulse generation time of the disturbance pulse that is positively correlated with the reproducing linear velocity.

In the optical disk device according to the fourth aspect, during the normal period, disturbance pulses are stored in a predetermined number of registers serving as shift registers, and during the defect detection period, the data stored in the registers at the defect detection start point is read out in a predetermined order so that the disturbance pulses are reproduced accurately. Therefore, the disturbance pulse correction signal generation means is allowed to generate a disturbance pulse correction signal which can correct adverse effects caused by the disturbance pulses with high precision. Moreover, the predetermined time that is a recognition time for a disturbance pulse can be set by changing the number of registers.

An object of the present invention is to obtain an optical disk device which can maintain the continuity of the control even before and after a defect detection without losing it, and provide a stable driving control operation for reproduction, etc. even when the defect detection period is long (in other words, the defect area is large, or the reproducing velocity is slow).

These and other objects, features, aspects, and advantages of the present invention will become more apparent from the following detailed description of the present invention when taken in conjunction with the accompanying drawings.

BRIEF DESCRIPTION OF THE DRAWINGS

FIGS. 1A to 1C are explanatory drawings that show the best-suited solution of a disk physical strain correction signal;

FIGS. 2A to 2C are explanatory drawings that show the effect of application of a disturbance pulse correction signal to a disturbance pulse;

FIGS. 3A to 3C are explanatory drawings that show the effect of application of a plurality of disturbance pulse correction signals to a disturbance pulse;

FIG. 4 is a block diagram that shows the construction of a disk device in accordance with a first preferred embodiment of the present invention;

FIG. 5 is a block diagram that shows the inner construction of a physical strain correction signal generation means in FIG. 4;

FIGS. 8A to 8D are explanatory drawings that show a detection method of a disturbance pulse;

FIGS. 9A and 9B are explanatory drawings that show the results of the defect compensation operation of the optical disk device in accordance with the first preferred embodiment of the present invention;

FIGS. 11A and 11B are explanatory drawings that show the results of the defect compensation operation of the optical disk device in accordance with the second preferred embodiment of the present invention;

FIGS. 12A and 12B are explanatory drawings that show an example of the application of a disturbance pulse memory means in accordance with a third preferred embodiment of the present invention;

FIGS. 14A and 14B are explanatory drawings that show a defect compensation operation by the defect compensation device of FIG. 13;

FIG. 15 is a block diagram that schematically shows a conventional defect compensation device (second construction);

FIGS. 16A and 16B are explanatory drawings that show a defect compensation operation by the defect compensation device of FIG. 15.

DESCRIPTION OF THE PREFERRED EMBODIMENTS

Principle of the Invention

Figure 6:
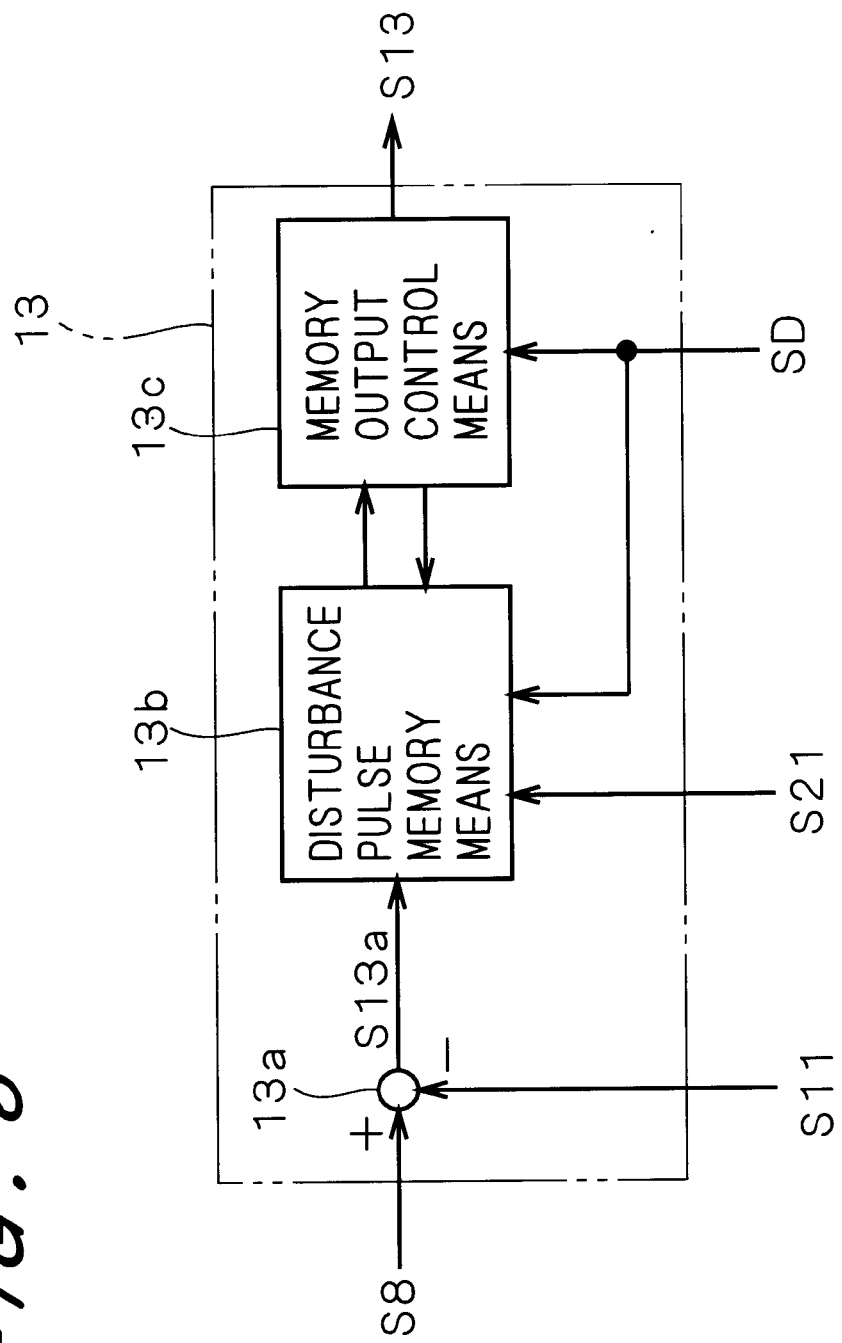
FIG. 6 is a block diagram that shows an example of the inner construction of a disturbance pulse correction signal generation means in FIG. 4.

At a defect portion on an optical disk, an error signal forms a false error signal that is a disturbance error signal. For this reason, in the defect compensation control, upon detection of a defect, the control loop needs to be completely cut off, and upon completion of the defect, the control needs to be led in immediately, while maintaining the continuity of the control. The detection of a defect means that there is a lack of error signal; therefore, it is understood that, in order to ensure a stable, continuous lead-in operation at the defect end, a disk physical strain correction signal is required instead of the error signal, so as to provide a tracking operation on the disk physical strain (eccentricity and vertical deviation) even during defect period.

Therefore, the control signal that is applied to the driving coil 3 at the time of the error detection is defined as the addition of the disk physical strain correction signal used for tracking and interpolating operations with respect to the disk physical strain during the defect detection period and the disturbance pulse correction signal for correcting the influences of the disturbance pulse that have been discussed in the Prior Art section. The following description will discuss the disk physical strain correction signal and the disturbance pulse correction signal.

(Optimal Disk Physical Strain Correction Signal)

FIGS. 1A to 1C are explanatory drawings that show the best suited solution for the disk physical strain correction signal. The optical disk, which is a tracking target, has eccentricity and vertical deviation as described earlier; therefore, since the disk is rotated, the tracking target forms a frequency function.

FIG. 1A shows the disk physical strain (eccentricity and vertical deviation) that is the tracking target, FIG. 1B shows a phase compensation signal which forms a basis of the actuator control signal at the time of the control operation, and is generated based upon the error signal, and FIG. 1C shows an output signal obtained by allowing the phase compensation signal to pass through a low-pass filter. In the Figures, the tracking target forms a periodic function with one rotation cycle T of the disk, and since the phase compensation signal tracks this, it has a periodic function synchronizing to the tracking target. Here, time t11 and time t12 show defect detection times on a disk 1.

As described earlier, the phase compensation signal is obtained by emphasizing an error signal in the range of several hundreds Hz to several KHz using the phase compensation means, and therefore has a waveform containing noise. Thus, it is not possible to use the phase compensation signal as an actuator control signal, as it is, or even when it is sample-held. For this reason, a filter, which transmits basic frequency components (fluctuation frequency components of the phase compensation signal), and regulates noise components in high bands, that is, a low-pass filter whose cut-off frequencies are set higher than the disk rotation frequency, is used so as to extract only the frequency components of the disk physical strain that are the tracking target from the phase compensation signal, and this is utilized as the disk physical strain correction signal (low-frequency correction signal).

With this method, even when a defect portion is located at an arbitrary position in one rotation cycle of the disk, the phase compensation signal is interpolated by the output of the low-pass filter; thus, it is possible to obtain an optimal signal from the macroscopic point of view.

(Disturbance Pulse Correction Signal)

Figure 17A:
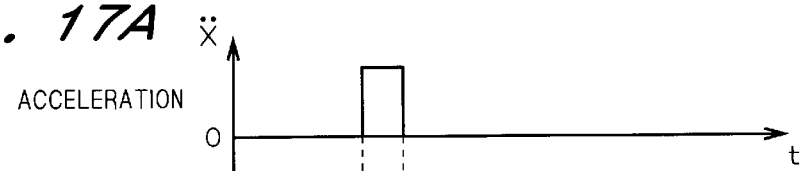
FIGS. 17A to 17C are explanatory drawings that show effects of the application of a disturbance pulse exerted on the speed and position of the actuator.
Figure 17B:
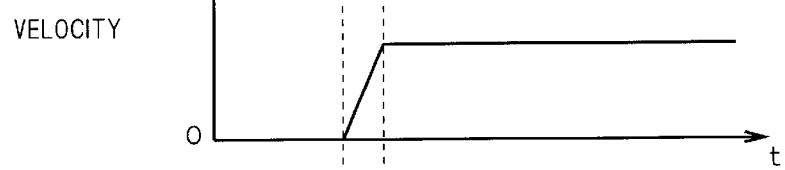
Figure 17C:
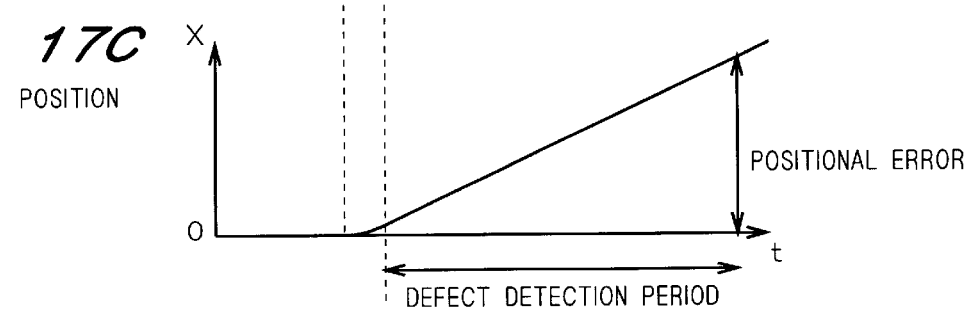

Referring to FIGS. 17A to 17C, influences caused by disturbance pulses have been explained. Here, the following description will discuss how to nullify the influences of disturbance pulses.

(1) Means for satisfying condition 2 required for obtaining stable, positive defect compensation (the relative velocity after defect compensation is zero)

Since the control target is in the secondary system, the application of a pulse having the reversed polarity with the same impulse as the impulse (the result obtained by multiplying acceleration by time) of a disturbance pulse makes the impulse exerted on the control target zero, thereby making the velocity zero. Therefore, the disturbance pulse correction signal is determined so as to have the same absolute value as the impulse of the disturbance pulse and the reversed polarity thereto.

FIGS. 2A to 2C are explanatory drawings that show the effects of application of the disturbance pulse correction signal to a disturbance pulse. As illustrated in FIG. 2A, the correction pulse SC1 is applied immediately after the disturbance pulse OP, that is, immediately after the detection of a defect. This is because if there is a delay in the timing of the application of the correction pulse SC1, the positional error increases at the defect end in proportion to the corresponding delay time. In this manner, the application timing of the correction pulse SC1 is set so as to take place immediately after the disturbance pulse OP so that the positional error at the defect end can be minimized. In the cases of FIGS. 2A to 2C, the waveform of the correction pulse SC1 is set so as to have the same waveform as the disturbance pulse with the reversed polarity thereto; however, as described earlier, it is clear that if the impulse is the same, the same effects can be obtained.

The application of the correction pulse SC1 as described above makes the velocity of the correction pulse SC1 become zero upon completion of its application. Therefore, after the application of the correction pulse SC1, the positional error $\Delta P$ at the defect end is set to a predetermined value without depending on the size of the defect or the length of the defect detection time. If this predetermined value is located within a range that allows the control system to carry out a stable lead-in operation, it is possible to realize a stable defect compensation by using only the present method.

(2) Means for satisfying condition 1 required for obtaining stable, positive defect compensation (the control error is zero)

In addition to means for satisfying condition 2 required for obtaining stable positive defect compensation, the following description also discuss the means for satisfying condition 1. It has already been described that, although the application of means (1) ensures that the velocity becomes zero, the positional error ΔP having a predetermined value arises. Since the positional error ΔP is exerted as a result of the continuous applications of the disturbance pulse OP and the correction pulse SC1, the positional error ΔP can be reduced to zero by successively applying signals respectively having reversed polarities of the disturbance pulse OP and the correction pulse SC1 in succession to the disturbance pulse OP and the correction pulse SC1.

FIGS. 3A to 3C are explanatory drawings that show effects of a case in which a plurality of disturbance pulse correction signals are applied. As illustrated in the Figures, in succession to the correction pulse SC1 shown in FIGS. 2A to 2C, a correction pulse SC2 and a correction pulse SC3 are further applied. The correction pulse SC2, which has the same polarity and the same waveform as the correction pulse SC1 (that is, the same waveform as the disturbance pulse OP and the reversed polarity thereto), is applied immediately after the correction pulse SC1. The application of the correction pulse SC2 allows the velocity of the control object indicated by (b) to have the same absolute value as the velocity raised by the application of the disturbance pulse OP with the reversed polarity thereto.

As indicated by (c), the position of the control target is being shifted in a direction so as to correct the positional error. The correction pulse SC3, which has a waveform having the same absolute value as the correction pulse SC1 with the reversed polarity thereto (that is, the same polarity and the same waveform as the disturbance pulse OP), is applied immediately after the correction pulse SC2. The application of the correction pulse SC3 makes the velocity of the control target become zero (see FIG. 3B), and at this time, as indicated by (c), with respect to the position of the control target, it becomes possible to correct the positional error ΔP to virtually zero. Therefore, in principle, the application of the present means (2) makes it possible to eliminate the positional error even when the defect is large, and also to set the relative speed to the disk to zero. Since these means satisfy both of the conditions (1) and (2) required for obtaining stable, positive defect compensation, independent on the size of a defect in the disk 1, it is possible to realize a stable, positive defect compensation.

Based upon the above-mentioned analytic explanation, the following description will discuss one preferred embodiment of the present defect compensation system of the present invention.

First Preferred Embodiment

FIG. 4 is a block diagram that shows a construction of a disk device in accordance with the first preferred embodiment of the present invention. As illustrated in this Figure, a control loop switch 7, which receives an error signal S6 and a fixed electric potential signal S0 from an error detection means 6, supplies the fixed electric potential signal S0 to a phase compensation means 8 during the defect detection period indicating a defect detection state with the defect detection signal SD going "high", while it supplies the error signal S6 to the phase compensation means 8 during the normal period indicating a normal state with the defect detection signal SD going "low".

Based upon the signal obtained through a control loop switch 7, the phase compensation means 8 generates a phase compensation signal S8.

Upon receipt of the phase compensation signal S8 and the defect detection signal SD, the disk physical strain correction signal generation means 11 generates a disk physical strain correction signal S11 based upon the phase compensation signal S8 in accordance with the timing control of the defect detection signal SD.

A disturbance pulse compensation signal generation means 13, which receives the phase compensation signal S8, the disk physical strain correction signal S11 and the defect detection signal SD, generates a disturbance pulse compensation signal S13 based upon the timing control of the defect detection signal SD, the phase compensation signal S8 and the disk physical strain correction signal S11.

An addition means 12 outputs a defect compensation signal S12 by adding the disk physical strain correction signal S11 and the disturbance pulse correction signal S13.

A selection switch 9, which receives the phase compensation signal S8 and the defect compensation signal S12, supplies the defect compensation signal S12 to the driver amplifier 10 as an actuator control signal S20 during the defect detection period with the defect detection signal SD going "high", while it supplies the phase compensation signal S8 as the actuator control signal S20 during the normal period with the defect detection signal SD going "low". In other words, the phase compensation signal S8 forms the normal actuator control signal S20, and the defect compensation signal S12 forms the actuator control signal S20 at the time of defect detection. Here, the other arrangements are the same as those of FIG. 15; therefore, the description thereof is omitted.

A control loop switch 7 turns off during the defect period with the defect detection signal SD going "high" (fixed to the fixed electric potential signal S0) so that a non-linear control error in the defect is blocked from the disk physical strain correction signal generation means 11.

As described earlier, the defect compensation signal S12, outputted from the addition means 12, is defined by the sum of the physical strain correction signal S11 that is an output of the disk physical strain correction signal generation means 11 and the disturbance pulse correction signal S13 that is the output of the disturbance pulse correction signal generation means 13.

The disk physical strain correction signal generation means 11 has a function for supplying a signal to the driving coil 3 so as not to allow the position of the control target (an objective lens 2) to track or deviate from the eccentricity or vertical deviation during the defect period.

FIG. 5 is a block diagram that shows the inner construction of the disk physical strain correction signal generation means 11. As illustrated in this Figure, the disk physical strain correction signal generation means 11 is constituted by a LPF (low-pass filter) 11a and a sample hold means 11b. The LPF11a sets a cut-off frequency to a frequency higher than the disk rotation frequency, and waveform-shapes the phase compensation signal S8 shown in FIG. 1B into a signal shown in FIG. 1C.

The sample hold means 11b holds the output signal of the low-pass filter 11a at the time of the rising edge to "high" (detect detection start time) of the defect detection signal SD. The output from the sample hold 11b forms the disk physical strain correction signal S11, and this is supplied to the addition means 12 and the disturbance pulse correction signal generation means 13.

FIG. 6 is a block diagram that shows one example of the inner construction of the disturbance pulse correction signal generation means 13. As illustrated in this Figure, the disturbance pulse correction signal generation means 13 is constituted by a disturbance pulse detection means 13a, a disturbance pulse memory means 13b and a memory output control means 13c.

The disturbance pulse detection means 13a subtracts the disk physical strain correction signal S11 from the phase compensation signal S8 so as to detect a disturbance pulse S13a. Based upon "L"/"H" of the defect detection signal SD, the disturbance pulse memory means 13b carries out a writing/reading operation. At the time of writing operation, it stores disturbance pulses S13a detected by the disturbance pulse detection means 13a from the latest one back to those detected during a predetermined time, in synchronism with the disturbance pulse sampling setting signal S21, and at the time of reading out operation, reads out the stored pulses under the control of the memory output control means 13c.

The memory output control means 13c receives the defect detection signal SD, and during the defect detection period with the defect detection signal SD going "high", controls the contents of the output and the output sequence of the disturbance pulse correction signal based upon the disturbance pulses stored in the disturbance pulse memory means 13b, and inverts the polarity of data read out from the disturbance pulse memory means 13b, and outputs the resulting signal as a disturbance pulse correction signal S13.

Figure 7A:
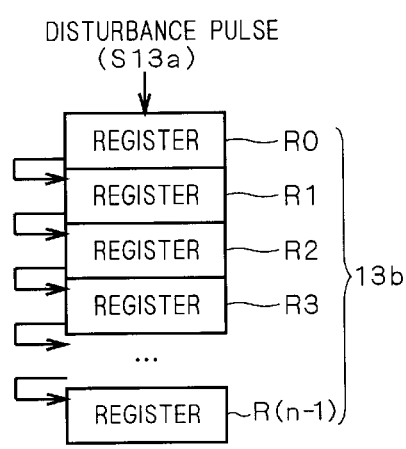
FIGS. 7A and 7B are explanatory drawings that show a specific structural example of a disturbance pulse memory means in FIG. 6.
Figure 7B:
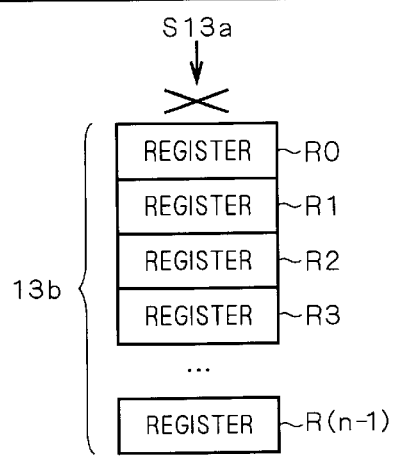

FIGS. 7A and 7B are explanatory drawings that show a specific structural example of the disturbance pulse memory means 13b. FIG. 7A shows the writing operation with the defect detection signal SD going "low", and FIG. 7B shows the reading-out operation with the defect detection signal SD going "high".

The disturbance pulse memory means 13b is constituted by n number of registers R0 to R(n−1) each having a predetermined bits. At the time when the defect detection signal SD goes "low" (normal mode), the n number of registers R0 to R(n−1) function as shift registers that shift in the order of 0 to (n−1) so that they shift from register R0 to R(n−1) while successively inputting the disturbance pulses S13a starting with the register R0 in synchronism with the disturbance pulse sampling setting signal S21.

At the time when the disturbance detection signal goes "high" (defect detection mode), the writing operation of the disturbance pulse is stopped, and the sequence shifts to the reading-out operation while maintaining the stored disturbance pulses. In the reading-out operation, in synchronism with the disturbance pulse sampling setting signals S21, data stored in the registers R0 to R(n−1) is inverted in its polarity, and successively outputted.

FIGS. 8A to 8D are explanatory drawings that show the detecting method of the disturbance pulses. FIGS. 8A to 8D are drawings that show the time axis in the vicinity of defect detection time t11 of FIGS. 1A to 1C in an enlarged manner.

FIG. 8A shows a defect detection signal SD, FIG. 8B shows a phase compensation signal S8, FIG. 8C shows a disk physical strain correction signal S11, and FIG. 8D shows a disturbance pulse S13a, respectively. Here, for convenience of explanation, waveforms are obtained in a case in which the control loop switch 7 is inputting the error signal S6 independent of the defect detection signal SD.

As shown in the Figures, by subtracting the component of the disk physical strain correction signal S11 (a low-frequency component signal obtained by removing a high-frequency component including a disturbance pulse from the phase compensation means 8) from an abnormal rise of the phase compensation signal S8 in the vicinity of time t11 that is the defect start, it is possible to extract the disturbance pulse S13a accurately.

FIG. 9A and FIG. 9B are explanatory drawings that show the results of the defect compensation operation by the optical disk device in accordance with the first preferred embodiment of the present invention. FIG. 9A and FIG. 9B show the operation of a defect compensation in the present invention carried out under the same conditions as those shown in FIGS. 14A and 14B that have been explained in the Prior Art Section. The definitions of the respective waveforms are the same as those shown in FIG. 14A and 14B; and FIG. 9A shows a case in which no defect process is carried out as in the cases of FIG. 14A and FIG. 16A, and FIG. 9B shows a case in which a defect process is carried out by the optical disk device of the first preferred embodiment.

The actuator control signal S20 of FIG. 9B shows that the compensation pulse SC1 is outputted immediately after defect detection time t1, and that this signal allows the velocity of the objective lens 2 to become zero, with the result that the error signal S6 is made smaller at the defect end. For this reason, the control lead-in operation can be completed immediately in a stable manner, and the amplitude degradation of the RF signal at the defect end becomes smaller, thereby making it possible to ensure a stable, positive defect compensation operation.

Second Preferred Embodiment

The second preferred embodiment relates to an optical disk device which can realize a defect compensation operation with higher precision. As already explained by reference to FIG. 3A to 3C, in the arrangement of the second preferred embodiment, the means (2) satisfying both the conditions (1) and (2) required for a stable, positive defect compensation is adopted, and with respect to the disturbance pulse correction signal, not only the correction pulse SC1, but also the correction pulses SC2 and SC3 are successively applied. The above-mentioned arrangement is realized by modifying the contents of the control of the memory output control means 13c in the first preferred embodiment in the following manner so as to satisfy the means (2).

In the same manner as the first preferred embodiment, the disturbance pulse memory means 13b of the second preferred embodiment is also constituted by n number of registers R0 to R(n−1), each having a predetermined bits. At the time when the defect detection signal SD goes "high" (normal mode), the n number of registers R0 to R(n−1) function as shift registers in the same manner as the first preferred embodiment, and successively input the disturbance pulses S13a starting with the register R0 in synchronism with the disturbance pulse sampling setting signal S21.

At the time when the disturbance detection signal goes "high" (defect detection mode), the disturbance pulse memory means 13b stops the writing operation of the disturbance pulse, and the sequence shifts to the reading-out operation while maintaining the stored disturbance pulses S13a.

Figure 10:
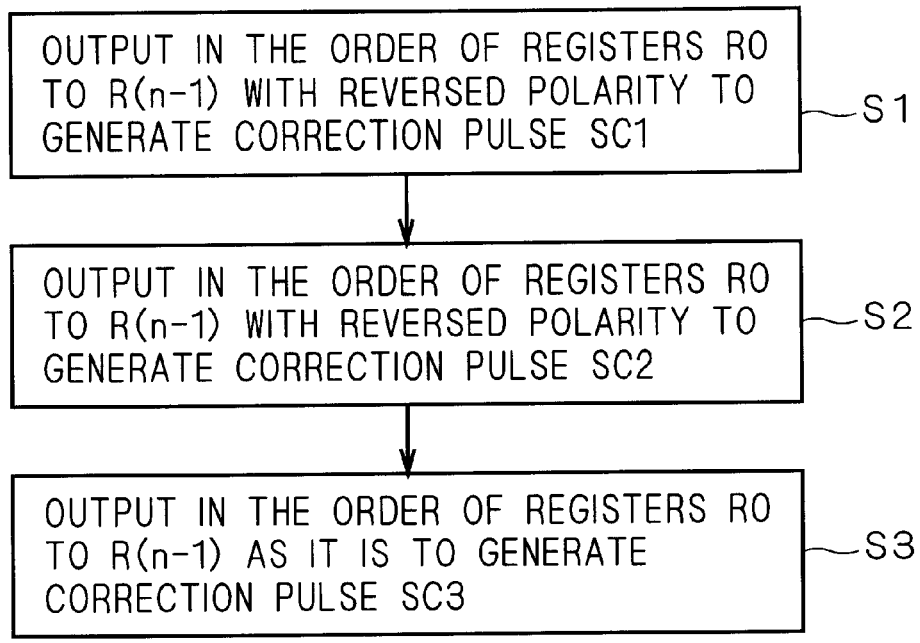
FIG. 10 is a flow chart that shows a control operation by a memory output control means of a second preferred embodiment.
Figure 13:
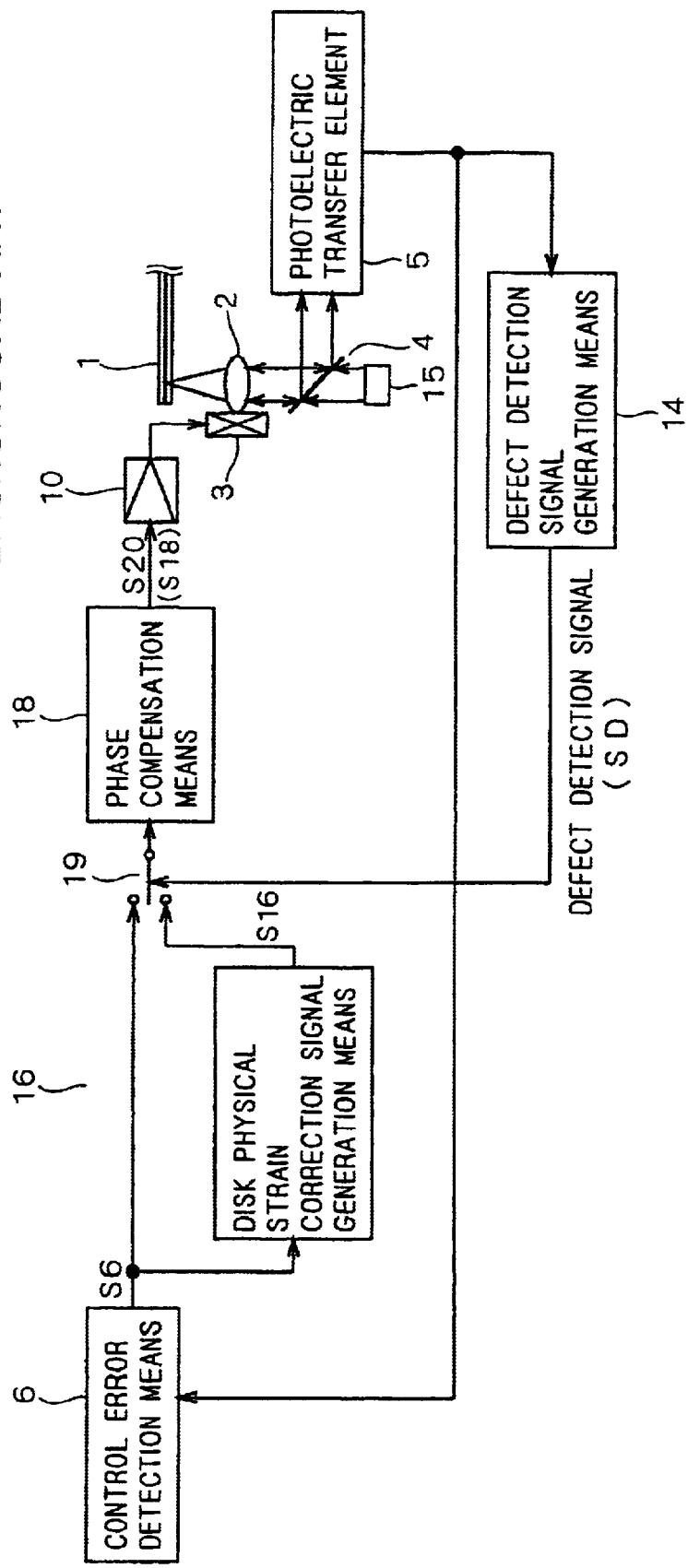
FIG. 13 is a block diagram that schematically shows a conventional defect compensation device (first construction)

FIG. 10 is a flow chart that shows the contents of the reading-out operation from the disturbance pulse storage means 13b carried out under the control of the memory output control means 13c at the time when the defect detection signal SD goes "low".

As shown in the Figure, at step S1, in synchronism with the disturbance pulse sampling setting signal S21, data stored in the registers R0 to R(n−1) is inverted in its polarity, and successively outputted, thereby forming a correction pulse SC1.

Thereafter, at step S2, in the same manner as step S1, in synchronism with the disturbance pulse sampling setting signal S21, data stored in the registers R0 to R(n−1) is inverted in its polarity, and successively outputted, thereby forming a correction pulse SC2.

Moreover, at step S3, in synchronism with the disturbance pulse sampling setting signal S21, data stored in the registers R0 to R(n−1) is successively outputted with its polarity maintained as it is, thereby forming a correction pulse SC3.

In this manner, the disk device of the second preferred embodiment is realized by modifying the contents of the control of the memory output control means 13c from the first preferred embodiment to the arrangement shown in FIG. 10 so as to satisfy the means (2). Therefore, the other arrangements are the same as those of the disk device of the first preferred embodiment shown in FIG. 4.

FIG. 11A and FIG. 11B are explanatory drawings that show the results of the defect compensation operation by the optical disk device in accordance with the second preferred embodiment of the present invention. FIG. 11A and FIG. 11B show the operation of a defect compensation in the present invention carried out under the same conditions as those shown in FIGS. 14A and 14B that have been explained in the Prior Art Section. The definitions of the respective waveforms are the same as those shown in FIG. 14A and 14B; and FIG. 11A shows a case in which no defect process is carried out as in the cases of FIG. 9A, and FIG. 11B shows a case in which a defect process is carried out by the optical disk device of the second preferred embodiment.

The actuator control signal S20 of FIG. 11B shows that the compensation pulse SC1, the compensation pulse SC2 and the compensation pulse SC3 are outputted immediately after defect detection time t1, and that these signals allow the velocity of the objective lens 2 to become zero, and also allow the control deviation at the defect end to become zero. For this reason, the control lead-in operation can be completed immediately in a stable manner, and the amplitude degradation of the RF signal at the defect end becomes smaller, thereby making it possible to ensure a stable, positive defect compensation operation regardless of the degree of defects on the disk 1.

Third Preferred Embodiment

It has already been described that the disturbance pulse is caused by a disturbance error mixed into the error signal S6 at the defect start. Therefore, the time length of the disturbance pulse forms a function dependant on the reproducing linear velocity (linear velocity of the disk 1 at the time of reproduction), and it is clear that as the linear velocity becomes faster, the time length of the disturbance pulse becomes shorter and as the linear velocity becomes slower, the time length of the disturbance pulse becomes longer. Consequently, it is preferable to vary the disturbance pulse memory time in response to the linear velocity. In other words, the third preferred embodiment realizes an optical disk device that can store disturbance pulses accurately.

The optical disk device of the third preferred embodiment has the same structure as that of the first and second preferred embodiments, except that only the construction of the disturbance pulse correction signal generation means 13 is slightly different. The disturbance pulse memory means 13b is constituted by m number of registers R0 to R(m−1), each having predetermined bits, and the m number of registers are set so as to respond to the slowest linear velocity.

Then, among the m number of registers 0k to R(m−1) prepared based upon the reproducing linear velocity, the number of actually-used registers k is set. In other words, when the reproducing linear velocity is slow, the number of registers k is set greater (the maximum m); in contrast, when it is fast, the number of registers k is set smaller. In this manner, the disturbance pulse memory time (the memory time using the k number of actually-used registers) is controlled so as to conform to the reproducing linear velocity.

FIGS. 12A and 12B are explanatory drawings that show an example of the application of the disturbance pulse memory means 13b in the third preferred embodiment. FIG. 12A shows a writing operation with the defect detection signal SD going "low", and FIG. 12B shows a reading-out operation with the defect detection signal SD going "high".

The m number of registers R0 to R(m−1), each having predetermined bits, in the disturbance pulse memory means 13b are classified into an actually-used register group 13b1 consisting of the actually-used k (k=1 to m) number of registers R0 to R(k−1) and an unused register group 13b2 consisting of the unused (m−k) number of registers Rk to R(m−1).

At the time when the defect detection signal SD is "low", the writing operation is carried out while using the registers R0 to R(k−1) of the actually-used register group 13b1 as shift registers that shift in the order of 0 to (k−1), and the registers Rk to R(m−1) of the unused-register group 13b2 are completely unused.

In contrast, at the time when the disturbance detection signal is "high", the actually-used register group 13b1 successively output data in the order to R0 to R(k−1), while the registers Rk to R(m−1) of the unused register group 13b2 are completely unused. Here, any of the disturbance pulse correction signals in the first preferred embodiment or the second preferred embodiment can be generated by changing the contents of the control of the memory output control means 13c.

Moreover, the cycle of the disturbance pulse sampling setting signal S21 serving as a sampling clock and the other constituent algorithms are set in the same manner as the first and second preferred embodiments. This arrangement makes it possible to realize a disturbance pulse storing operation suitable for the disturbance pulse length and a stable defect compensation.

Here, an explanation has been given of a disturbance pulse storing operation suitable for the reproducing linear velocity that is carried out by changing the number k of the actually-used registers without changing the cycle of the disturbance pulse sampling setting signal S21; however the number k of registers may be fixed, and the cycle of the disturbance pulse sampling setting signal S21 may be changed based upon the reproducing linear velocity. This arrangement of course makes it possible to provide the same effects.

While the invention has been shown and described in detail, the foregoing description is in all aspects illustrative and not restrictive. It is therefore understood that numerous other modifications and variations can be devised without departing from the scope of the invention.

What is claimed is:

1. An optical disk device comprising:
light emitting means for emitting light to an optical disk;
driving means for carrying out a predetermined operation with respect to said optical disk based upon a driving control signal;
reflected light information detection means for detecting reflected light information related to reflected light from said optical disk;

normal control signal generation means for generating a normal control signal for determining amount of control in said predetermined operation based upon said reflected light information;

defect detection signal generation means for generating a defect detection signal for specifying presence or absence of a defect area lacking optical information in said optical disk based upon said reflected light information, a period in which said defect detection signal indicates that there is no defect area being defined as a normal period and a period in which said defect detection signal indicates that there is a defect area being defined as a defect detection period;

low frequency correction signal generation means for performing a filtering process to said normal control signal, said filtering process allowing a varying frequency of said normal control signal to pass and removing a high frequency component of the same to generate a low frequency component signal as a low frequency correction signal in said normal period, and for generating said low frequency component signal sampled at the time of defect detection start when said normal period is switched to said defect detection period as said low frequency compensation signal in said defect detection period;

disturbance pulse correction signal generation means for recognizing a disturbance pulse based upon a difference between said low frequency correction signal and said normal control signal during a period from the time of said defect detection start back to a predetermined point of time to generate a disturbance pulse correction signal containing a first correction pulse obtained by inverting a polarity of said disturbance pulse with the same impulse with said disturbance pulse;

addition means for obtaining a defect compensation signal by adding said disturbance pulse correction signal to said low frequency correction signal; and signal selection means for selecting said normal control signal as said driving control signal during said normal period, and selecting said defect compensation signal as said driving control signal during said defect detection period.

2. The optical disk device according to claim 1, wherein said predetermined operation includes a reproducing operation of information recorded on said optical disk, and said predetermined time is set based upon a reproducing linear velocity that is a linear velocity at the time of the reproducing operation of said optical disk.

3. The optical disk device according to claim 1, wherein said disturbance pulse correction signal generation means comprises a predetermined number of registers that successively stores said disturbance pulses while shifting them in a predetermined order during said normal period, said predetermined time includes a period of time during which said registers carries out said storing process, said optical disk device further comprising:
a correction pulse generation control means for generating said disturbance pulse correction signal based upon said disturbance pulses being reproduced by reading out the data stored in said registers at said time of defect detection start in said predetermined order, during said defect detection period.

4. The optical disk device according to claim 1, wherein said disturbance pulse correction signal includes a second and third correction pulse succeeding to said first correction pulse, said second correction pulse includes a pulse obtained by inverting a polarity of said disturbance pulse with the same impulse as said disturbance pulse, said third correction pulse includes a pulse that has the same polarity and the same impulse as said disturbance pulse.

5. The optical disk device according to claim 4, wherein said disturbance pulse correction signal generation means comprises a predetermined number of registers that successively stores said disturbance pulses while shifting them in a predetermined order during said normal period, said predetermined time includes a period of time during which said registers carries out said storing process, said optical disk device further comprising:
a correction pulse generation control means for generating said disturbance pulse correction signal based upon said disturbance pulses being reproduced by reading out the data stored in said registers at said time of defect detection start in said predetermined order, during said defect detection period.

6. The optical disk device according to claim 4, wherein said predetermined operation includes a reproducing operation of information recorded on said optical disk, and said predetermined time is set based upon a reproducing linear velocity that is a linear velocity at the time of the reproducing operation of said optical disk.

7. The optical disk device according to claim 6, wherein said disturbance pulse correction signal generation means comprises a predetermined number of registers that successively stores said disturbance pulses while shifting them in a predetermined order during said normal period, said predetermined time includes a period of time during which said registers carries out said storing process, said optical disk device further comprising:
a correction pulse generation control means for generating said disturbance pulse correction signal based upon said disturbance pulses being reproduced by reading out the data stored in said registers at said time of defect detection start in said predetermined order, during said defect detection period.

* * * * *